United States Patent
Price et al.

(10) Patent No.: US 10,565,720 B2
(45) Date of Patent: *Feb. 18, 2020

(54) EXTERNAL IR ILLUMINATOR ENABLING IMPROVED HEAD TRACKING AND SURFACE RECONSTRUCTION FOR VIRTUAL REALITY

(71) Applicant: MICROSOFT TECHNOLOGY LICENSING, LLC, Redmond, WA (US)

(72) Inventors: Raymond Kirk Price, Redmond, WA (US); Michael Bleyer, Seattle, WA (US); Christopher Stephen Messer, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,195

(22) Filed: Mar. 27, 2018

(65) Prior Publication Data

US 2019/0304116 A1    Oct. 3, 2019

(51) Int. Cl.
*G06T 7/593* (2017.01)
*G06T 7/521* (2017.01)
(Continued)

(52) U.S. Cl.
CPC .............. *G06T 7/593* (2017.01); *G06T 7/521* (2017.01); *H04N 13/254* (2018.05); *H04N 13/344* (2018.05); *G06T 2207/10028* (2013.01)

(58) Field of Classification Search
CPC .................... G06T 7/593; G06T 7/521; G06T 2207/10028; G06T 19/006; H04N 13/254;
(Continued)

(56) References Cited

U.S. PATENT DOCUMENTS 6,900,777 B1    5/2005  Hebert et al.
2005/0219552 A1  10/2005  Ackerman et al.
(Continued)

FOREIGN PATENT DOCUMENTS

WO    2017117675 A1    7/2017
WO    2017139871 A1    8/2017

OTHER PUBLICATIONS

"Non Final Office Action Issued in U.S. Appl. No. 15/933,122", dated Apr. 4, 2019, 15 Pages.
(Continued)

*Primary Examiner* — Dramos Kalapodas
(74) *Attorney, Agent, or Firm* — Workman Nydegger

(57) ABSTRACT

Disclosed embodiments include methods and systems for utilizing a structured projection pattern to perform depth detection. In some instances, the structured projection pattern forms a dot pattern, which is projected by a projector, wherein the projector includes one or more infrared (IR) light dot pattern illuminators for projecting an IR light dot pattern to a surrounding environment. The IR dot pattern light that is at least partially reflected off one or more objects in the surrounding environment is detected by one or more cameras attached to a head-mounted display (HMD). The HMD, which is physically untethered from the projector, utilizes the captured IR dot pattern light reflections to track movement of the HMD and/or perform depth detection of one or more objects in the environment surrounding the HMD.

14 Claims, 12 Drawing Sheets

(51) Int. Cl.
*H04N 13/254* (2018.01)
*H04N 13/344* (2018.01)

(58) Field of Classification Search
CPC ............... H04N 13/344; H04N 13/239; G06K 9/00355; G06K 9/78; G06F 17/289; G02B 27/172
See application file for complete search history.

(56) References Cited

U.S. PATENT DOCUMENTS

| | | | |
|---|---|---|---|
| 2009/0073324 A1* | 3/2009 | Tan | H04N 5/2628 348/745 |
| 2013/0076789 A1* | 3/2013 | Majumder | H04N 9/3147 345/633 |
| 2013/0100256 A1 | 4/2013 | Kirk et al. | |
| 2014/0070922 A1 | 3/2014 | Davis | |
| 2014/0104416 A1 | 4/2014 | Giordano et al. | |
| 2014/0292817 A1* | 10/2014 | Iversen | H04N 13/246 345/672 |
| 2014/0307055 A1 | 10/2014 | Kang et al. | |
| 2014/0307058 A1 | 10/2014 | Kirk et al. | |
| 2015/0054734 A1* | 2/2015 | Raghoebardajal | G06F 3/017 345/156 |
| 2015/0229915 A1 | 8/2015 | Kirk et al. | |
| 2015/0302648 A1* | 10/2015 | Zhang | H04N 13/344 345/426 |
| 2015/0316767 A1* | 11/2015 | Ebstyne | G06T 7/80 345/8 |
| 2015/0381972 A1 | 12/2015 | Kowdle et al. | |
| 2016/0005219 A1 | 1/2016 | Powell et al. | |
| 2016/0088287 A1* | 3/2016 | Sadi | G03B 35/08 348/43 |
| 2016/0183014 A1 | 6/2016 | Guo et al. | |
| 2016/0259168 A1 | 9/2016 | Katz et al. | |
| 2016/0260251 A1 | 9/2016 | Stafford et al. | |
| 2016/0360970 A1* | 12/2016 | Tzvieli | G01J 5/0265 |
| 2017/0092220 A1* | 3/2017 | Mullins | G09G 5/003 |
| 2017/0094251 A1* | 3/2017 | Wolke | H04N 13/246 |
| 2017/0142312 A1 | 5/2017 | Dal mutto et al. | |
| 2017/0148169 A1 | 5/2017 | Kyung | |
| 2017/0161561 A1* | 6/2017 | Marty | G06K 9/00724 |
| 2017/0322309 A1 | 11/2017 | Godbaz et al. | |
| 2017/0322310 A1 | 11/2017 | Godbaz et al. | |
| 2018/0046874 A1* | 2/2018 | Guo | G06K 9/3208 |
| 2018/0048880 A1 | 2/2018 | Trail et al. | |
| 2018/0061034 A1* | 3/2018 | Zhao | G02B 27/0172 |
| 2018/0061056 A1 | 3/2018 | Zhao et al. | |
| 2018/0063510 A1 | 3/2018 | Wolke et al. | |
| 2018/0075659 A1* | 3/2018 | Browy | G06T 19/006 |
| 2018/0088340 A1 | 3/2018 | Amayeh et al. | |
| 2018/0247424 A1 | 8/2018 | Bleyer et al. | |
| 2018/0276467 A1* | 9/2018 | Kaehler | G02B 27/017 |
| 2019/0072770 A1* | 3/2019 | Hall | G01B 5/0014 |
| 2019/0072771 A1* | 3/2019 | Hall | G01B 5/0014 |
| 2019/0295269 A1 | 9/2019 | Bleyer et al. | |
| 2019/0297312 A1 | 9/2019 | Price et al. | |
| 2019/0297316 A1 | 9/2019 | Bleyer et al. | |

OTHER PUBLICATIONS

"International Search Report & Written Opinion Issued in PCT Application No. PCT/US19/023051", dated May 24, 2019, 13 Pages.

Weng, et al., "Study on an indoortracking system with infrared projected markers for large-area applications", In Proceedings of VRCAI ACM siggraph international conference on virtual reality continuum and its applications in industry, Dec. 14, 2009, 8 Pages.

"International Search Report and Written Opinion Issued in PCT Patent Application No. PCT/US19/022163", dated Jul. 1, 2019, 11 Pages.

"International Search Report & Written Opinion Issued in PCT Patent Application No. PCT/US19/022164", dated Jul. 3, 2019, 13 Pages.

"Final Office Action Issued in U.S. Appl. No. 15/933,122", dated Oct. 1, 2019, 15 pages.

"Non-Final Office Action Issued in U.S. Appl. No. 15/928,787", dated Sep. 27, 2019, 15 pages.

"Non Final Office Action Issued in U.S. Appl. No. 15/928,868", dated Oct. 21, 2019, 15 pages.

* cited by examiner

1100

1101
Projecting A Flood Of Infrared (IR) Light Onto Objects In An Environment Surrounding A Projector, The IR Light Being At Least Partially Reflected By The Objects As Reflected IR Light, Wherein The Projector Is Physically Untethered From A HMD 1103
Detecting At Least A Portion Of The Reflected IR Light With One Or More Cameras Attached To The HMD 1105
Utilize The Portion Of The Reflected IR Light Detected By The One Or More Cameras To Perform Pose Tracking Of The HMD

Figure 11

EXTERNAL IR ILLUMINATOR ENABLING IMPROVED HEAD TRACKING AND SURFACE RECONSTRUCTION FOR VIRTUAL REALITY

BACKGROUND

Mixed-reality systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

The disclosed mixed-reality systems use one or more on-body devices (e.g., the HMD, a handheld device, etc.). The HMD provides a display that enables a user to view overlapping and/or integrated visual information in whatever environment the user is in, be it a VR environment or an AR environment. By way of example, as shown in FIG. 1, a mixed-reality system may present virtual content to a user in the form of a simulated vase resting on a real table surface.

Continued advances in hardware capabilities and rendering technologies have greatly improved how mixed-reality systems render virtual objects. However, the process of immersing a user into a mixed-reality environment creates many challenges, difficulties, and costs, particularly with regard to determining three-dimensional spatial information around the user and tracking a user's movement so the visual display of information can be correctly presented to the user.

For instance, by way of example, conventional passive stereo depth detection systems fail to adequately determine the depth of a smooth or low texture surface (e.g., a wall) in a mixed-reality environment because those systems fail to adequately distinguish one part of the smooth/textureless surface from another part. As such, there is a substantial need to improve how depth is detected, especially for smooth/textureless surfaced objects in mixed-reality environments.

Additionally, many conventional HMD systems require separate/additional hardware that is mounted to the HMD for performing depth detection, from the hardware that is required to perform head tracking. This additional hardware adds to the overall cost, weight, battery consumption and size of the HMD systems, and leads to resource allocation issues on HMD systems.

Another problem with conventional HMD systems is that they often perform tracking and depth detection poorly in low light environments, due to the lack of light even when the HMD is configured to emit light.

The subject matter claimed herein is not limited to embodiments that solve any disadvantages or that operate only in environments such as those described above. Rather, this background is provided only to illustrate one exemplary technology area where some embodiments described herein may be practiced.

BRIEF SUMMARY

Disclosed embodiments include methods and systems for utilizing a structured projection pattern to perform depth detection. In some instances, the structured projection pattern forms a dot pattern, which is projected by a projector, wherein the projector includes one or more infrared (IR) light dot pattern illuminators for projecting an IR light dot pattern to a surrounding environment. Embodiments disclosed herein are also able to operate using visible light to detect depth. As a result, visible light, IR light, or a combination of both visible light and IR light may be used to determine an object's depth. The IR dot pattern light that is at least partially reflected off one or more objects in the surrounding environment is detected by one or more cameras attached to a head-mounted display (HMD). These cameras are also able to detect visible light. The HMD, which is physically untethered from the projector, utilizes the captured IR dot pattern light reflections and/or the visible light reflections to track movement of the HMD and/or perform depth detection of one or more objects in the environment surrounding the HMD.

In some embodiments, the projector projects light to provide additional lighting and/or texture to an environment surrounding a HMD to improve inside-out tracking (i.e., tracking based on cameras in the HMD).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 also illustrates a table and a virtual object (i.e. the vase) that are visible to the user of the HMD.

FIG. 11 provides flow diagram representing a method for tracking movement of a HMD with the HMD and a projector physically untethered from the HMD. The HMD is able to track the movements using visible light, IR light, or a combination of visible and IR light.

DETAILED DESCRIPTION

Figure 1:
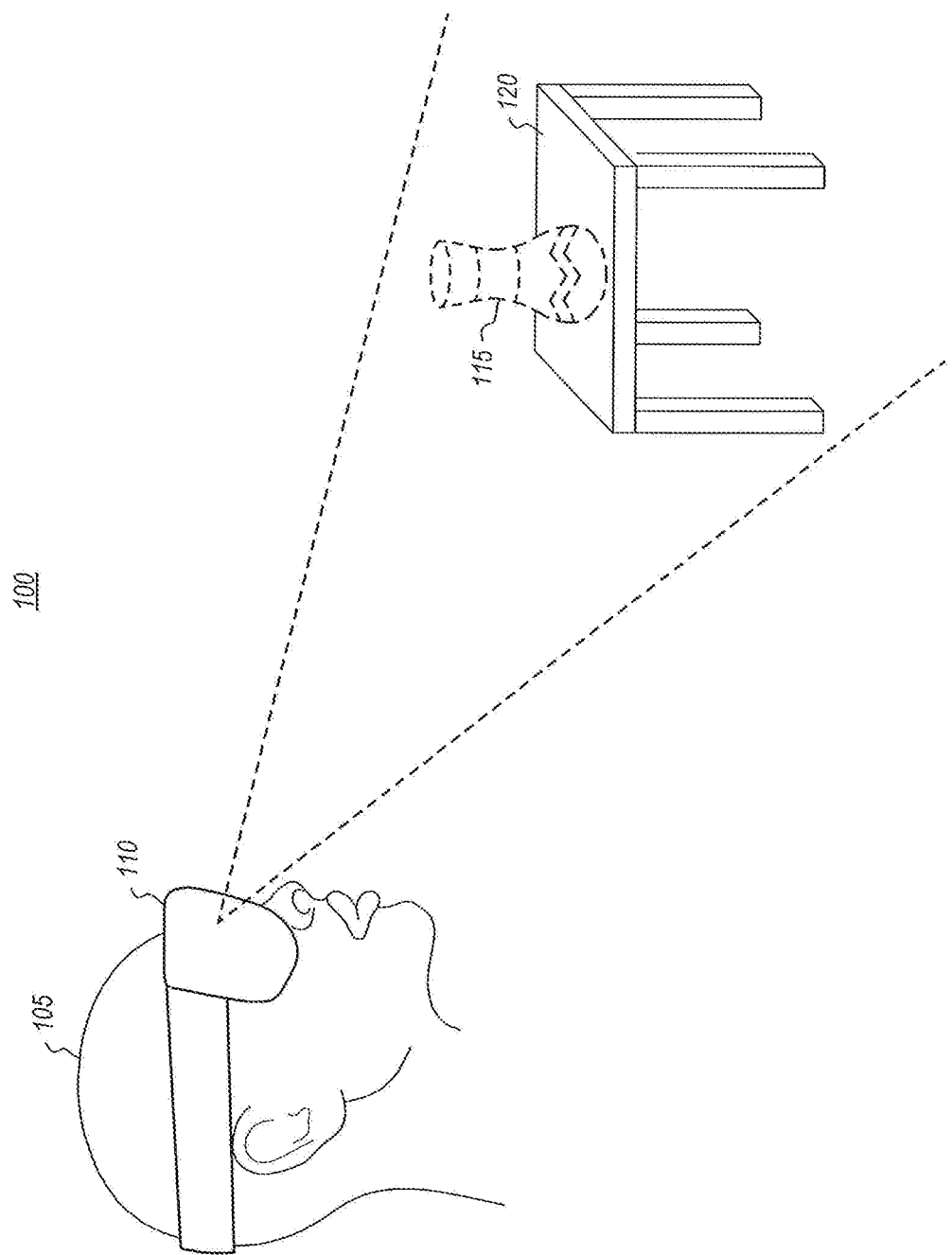
FIG. 1 shows a head-mounted device (HMD) structured to identify its location and orientation with respect to its surrounding environment (i.e. motion detection) as well as to determine the depth of an object in that environment.

At least some of the embodiments described herein relate to head-mounted devices (HMDs) configured to perform depth detection by generating a 3D geometry mapping of the surrounding environment. As an initial matter, the HMD may include one or more cameras, including a stereo camera pair comprising a first and second camera. Both cameras are mounted on the HMD, and are collectively and/or independently able to detect visible light and infrared (IR) light. Such positioning is beneficial for motion tracking purposes because it allows the cameras to capture a large amount of area in the surrounding environment. By capturing more area, the HMD is better able to track movements. Furthermore, in at least some implementations, at least a part of the cameras' fields of view overlap with one another (i.e. an overlapping field of view region).

At least some of the embodiments described herein relate to a projector including one or more IR light illuminators. The projector is configured to emit an IR structured illumination pattern that spans an illumination area (e.g., an IR dot pattern and/or an IR flood illumination). The projector is physically untethered from the HMD and is aimed/oriented in such a particular manner that the IR structured illumination pattern projected from the projector at least partially overlaps with the fields of view of one or both cameras of the HMD and preferably both fields of view. Such a configuration is beneficial for enabling the camera system to capture the reflections of the IR structured illumination pattern as well as visible light that reflects off of the same object(s) in the surrounding environment by both cameras of the camera system.

By obtaining digital image content corresponding to the IR dot-pattern texturing and/or visible light, the HMD is able to improve the quality of the calculated 3D geometry of the surrounding environment by determining the stereoscopic depth(s) for each object. This beneficially improves the manner in which objects, particularly textureless/smooth surfaced objects, are reconstructed with depth detection processing by HMD systems.

Inclusively or additionally, the IR structured illumination pattern light projected by the projector can also be utilized by one or more cameras of the HMD to improve the tracking processing performed by HMD by facilitating the manner in which anchor points are identified (with reflected pattern light and/or visible light) within the surrounding environment.

Accordingly, it will be appreciated that the disclosed embodiments can be used to provide significant improvements over how HMDs perform depth detection, particularly for objects having textureless/smooth surfaces. This is accomplished, for example, by using the HMD to apply and sense IR dot-pattern texturing applied to the surfaces of the objects in the environment surrounding the HMD as well as by sensing reflected visible light. This IR dot-pattern beneficially augments any detected visible light when performing depth detection. In this manner, it is possible to clearly and accurately determine any object's depth, even when that object has textureless/smooth surfaces.

Additionally, in at least some instances, the present embodiments improve the tracking of the HMD by providing techniques for identifying additional anchor points that may not be identifiable without supplemental illumination from a projector. Furthermore, because the projector is physically untethered from the HMD, the systems and methods described herein may reduce or eliminate resource allocation issues in systems performing depth detection and head tracking (e.g., battery consumption, overall weight, etc.).

Having just described some of the various high-level features and benefits of the disclosed embodiments, attention will now be directed to FIGS. 1 through 11. These figures illustrate various architectures, methods, and supporting illustrations related to utilizing a projector to add visible texture to a surface to better determine that surface's depth and/or improve head tracking. Subsequently, the disclosure will turn to FIG. 12, which presents an example computer system that may be used to facilitate the disclosed principles.

Improved Depth Detection and Head Tracking Systems

Attention is now directed to FIG. 1, which illustrates an example environment 100 of a user 105 using a HMD 110. The HMD 110 is an example of a mixed-reality system that is able to render virtual content for the user 105. As previously noted, the HMD 110 may be a VR system or an AR system, such that environment 100 may be a VR environment or an AR environment. The term environment, mixed-reality environment and surrounding environment will be used interchangeably herein to refer to environment 100 and other HMD environments referenced herein.

In world-locked holograms/mixed-reality environments (aka world-stabilized imaging), a user may experience discomfort when his/her head movement is not matched to what is visually displayed. Therefore, it is desirable to provide the user 105 with as pleasant an experience as possible while the user 105 is wearing the HMD 110 by determining the user's position in relation to the various objects in the environment 100 (i.e. to perform depth detection and head tracking).

In FIG. 1, the environment 100 is shown as including a first object 115 and a second object 120. To obtain an accurate mapping of the real objects in the scene (aka mixed-reality environment), it is beneficial to know how far away these objects are from the user 105 at any given moment. By following the principles disclosed herein, significant advantages are realized because highly accurate depth determinations may be performed. By performing these depth determinations, the mixed-reality environment, which is created by the HMD 110, can accurately place virtual objects that interact with the real world. This results in a more life-like interaction of virtual and real world objects, and the user 105's experience will be significantly improved.

Figure 2:
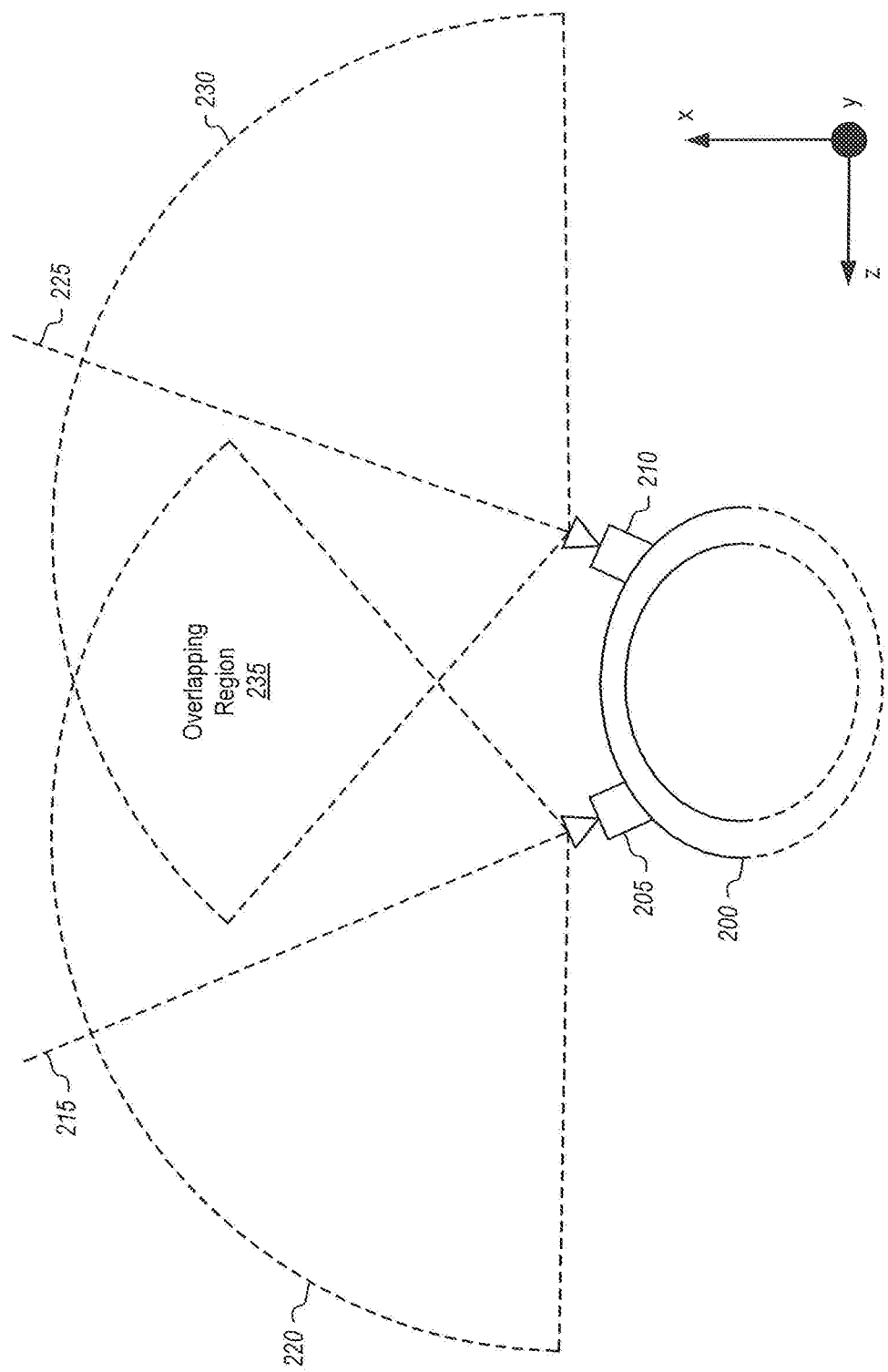
FIG. 2 illustrates a HMD that includes a stereo camera pair which can be used to perform motion detection and which can also be used to perform depth detection using an overlapping field of view region existing between the two cameras' fields of view.

FIG. 2 shows a HMD 200 that is specially configured to perform advanced depth determinations in addition to rendering mixed-reality environments. For reference, this HMD 200 is one example implementation of the HMD 110 from FIG. 1. FIG. 2 is illustrated from a top perspective, looking down at the HMD 200, as indicated by the "x, y, z" direction legend.

As shown, HMD 200 includes a head-tracking stereo camera pair which includes at least two cameras, namely camera 205 and camera 210, both of which are mounted on the HMD 200. According to the disclosed embodiments, the head tracking stereo camera pair may be used for multiple different operations, including, but not limited to, capturing images for tracking the movements of the HMD 200, as well as capturing images for determining depth.

Although HMD 200 is shown as including only two cameras, the HMD 200 may actually include any number of cameras. For instance, the HMD 200 may include 3 cameras, 4 cameras or more than four cameras. As such, the HMD 200 is not limited only to two cameras.

Camera 205 is shown as including an optical axis 215. For reference, a camera's optical axis is an imaginary "line" that passes through the direct center of the camera's lens. As a practical example, an optical axis is akin to the point where the camera is being aimed. In addition to the optical axis 215, FIG. 2 also shows that camera 205 has a field of view 220. In some implementations, camera 205 includes a wide-angle lens such that the field of view 220 is also a wide-angle field of view. This wide-angle field of view may span a range anywhere from 45 degrees up to 180 degrees horizontally (in ultra-wide-angle cameras) and anywhere from 45 degrees up to 120 degrees vertically.

Camera 210 may be configured similarly to camera 205. For instance, camera 210 similarly includes an optical axis 225 and a field of view 230. By combining the fields of view of the two cameras, a very large spanning area (e.g., 170 degrees, 180 degrees, etc.) around the HMD may be captured.

These cameras may be configured in many different ways. For example, in some implementations, both of the cameras 205 and 210 are configured as global shutter cameras. In other implementations, however, the cameras 205 and 210 are configured as rolling shutter cameras. Of course, combinations of global shutter and rolling shutter cameras may also be used. As an example, the camera 205 may be a global shutter camera while the camera 210 may be a rolling shutter camera. In a preferred embodiment, a global shutter camera is used because rolling shutter cameras are more prone to motion blur. Of course, the HMD 200 may have many cameras, some of which are global shutter and some of which are rolling shutter.

In some implementations, the cameras 205 and 210 (and in particular the pixels of these cameras) may be configured to detect, or rather be sensitive to, different spectrums of light (e.g., visible light and infrared (IR) light). For reference, the visible light spectrum ranges anywhere from around 380 nanometers (nm) up to and including about 740 nm. More specifically, violet light ranges from 380 nm to 435 nm. Blue light ranges from 435 nm to 500 nm. Green light ranges from 500 nm to 520 nm. Yellow light ranges from 565 nm to 590 nm. Red light ranges from 625 nm to 740 nm.

To capture light (e.g., visible light and/or IR light), pixels of the cameras 205 and 210 are exposed to light during a pre-selected exposure period. During this exposure period, the pixels sense photons and generate an electrical response based on the amount and/or intensity of the sensed photons. This exposure period may be a variable exposure time such that it changes from one exposure instance to another exposure instance. As will be described in more detail later, the HMD is able to control the exposure time of the cameras 205 and 210 to coincide/sync with one or more other light emitting components (e.g., an IR dot-pattern illuminator and/or a flood IR illuminator).

In contrast to visible light, infrared (IR) light is invisible to a human's eye and has a wavelength that is longer than the wavelengths for visible light. The infrared light spectrum starts at the trailing edge of the red light spectrum, around 700 nm, and extends to at least 1 um in length.

With that said, cameras 205 and 210 (at a pixel level) are configured to detect both visible light and IR light. In some instances, one or more of the cameras 205 and 210 are monochromatic cameras (i.e. greyscale). In some instances, one or more of the cameras 205 and 210 are chromatic cameras.

Of course, the cameras 205 and 210 may also be configured to detect only portions of the visible light spectrum and portions of the IR light spectrum. This may be achieved through the use of one or more optical bandpass filters in the lens. For brevity, the remaining disclosure will simply use the singular form of the term bandpass filter even though each camera may be configured with its own similarly configured or uniquely different bandpass filter.

The bandpass filter is configured, in some instances, to allow only a selected range of visible light to pass through and be detected by one or more corresponding camera(s) and while also allowing some or all IR light to also be detected by the same camera(s). Additionally, or alternatively, the bandpass filter may be configured to allow only a selected range of IR light to pass through and be detected by the one or more corresponding camera(s) while allowing some or all visible light to pass through and be detected by the same camera(s).

By way of example, the bandpass filter is configured in some embodiments to pass visible light having wavelengths between approximately 400 nm up to approximately 700 nm. In some embodiments, the bandpass filter is also specifically configured to pass IR light having wavelengths corresponding to the same wavelengths of IR light emitted by an IR laser mounted on the HMD 200 (to be discussed in more detail later). One example of the IR laser's wavelength may be approximately 850 nm. As such, the bandpass filter may pass IR light having wavelengths within a threshold value of the IR laser's wavelengths (e.g., within 10 nm, 20 nm, 30 nm, 40 nm, 50 nm, etc. of the emitted IR wavelength) while not passing other IR light wavelengths.

In view of the foregoing, it will be appreciated that one or both cameras 205 and 210 may include a bandpass filter that allows at least some visible light to pass through the bandpass filter (while potentially filtering out some visible light) and at least some IR light to pass through the bandpass filter (while potentially filtering out some IR light). Likewise, in some implementations, camera 205 and/or camera 210 may also omit any IR light filter.

FIG. 2 also shows how the cameras 205 and 210 may be positioned in relation to each other on the HMD 200. For example, at least a part of the field of view 220 of camera 205 is shown as overlapping at least a part of the field of view 230 of camera 210 thus forming the overlapping region 235 (aka an "overlapping field of view region"). This overlapping region 235 is beneficial for a number of reasons, which will be discussed later.

However, it will be appreciated that certain advantages of the embodiments disclosed herein may be realized by HMD systems with a single camera or with multiple cameras with fields of view that do not overlap. For example, a HMD with two cameras with non-overlapping fields of view will benefit from additional anchor points which may be utilized in tracking the movement of the HMD, even though two cameras without an overlapping field of view cannot perform stereoscopic depth calculations.

In some configurations, the cameras may be horizontally offset (e.g., offset relative to a horizontal alignment of the HMD 200 in the y-direction plane). For instance, camera 205 may be pointed slightly downward or upward in the y-direction while camera 210 may be aligned with the horizontal plane (e.g., y-direction). In this manner, the camera 205 may have a y-angle offset in relation to the horizontal alignment of the HMD 200. Relatedly, the camera 210 may be pointed slightly downward or upward in the y-direction relative to camera 205, while camera 205 is aligned with the y-direction horizontal plane. Of course, combinations of the above are also available. For instance, camera 205 may be pointed slightly downward relative to the horizontal plane and camera 210 may be pointed slightly upward relative to the horizontal plane, and vice versa. Alternatively, cameras 205 and 210 are horizontally aligned, such that they do not have any y-angle offset and such that they are pointed directionally level in the y-direction.

Additionally, or alternatively, to the above horizontal alignments/offsets, cameras 205 and 210 may also be aligned/offset in other directions. For instance, FIG. 2 shows that the optical axis 215 of camera 205 is angled (i.e. non-parallel) in relation to the optical axis 225 of camera 210 in the x-direction. Such a configuration is sometimes beneficial because it allows the cameras 205 and 210 to capture a larger area of the surrounding environment, thus providing more reference area when performing movement detection (e.g., head tracking). This angle offset may be any selected angle. Example angles include, but are not limited to 5 degrees, 10, 15, 20, 25, 30, 35, 40, 45, 50, 55, 60, 65, 70, 75, 80, 85 degrees, and so on.

Although FIG. 2 and the remaining figures show the cameras 205 and 210 angled in relation to one another, the embodiments should not be limited to such a configuration. In fact, in some instances, the optical axes 215 and 225 are aligned in parallel with one another in the x direction. In any event, and regardless of which orientation is used, the disclosed embodiments advantageously create overlapping region 235 with the fields of view 220 and 230.

Yet another configuration is available for the cameras 205 and 210. To illustrate, the vertical positions of the cameras 205 and 210 (i.e. the relative height of the cameras along the y-direction on the HMD 200) may also vary. As an example, camera 205 may be positioned below camera 210 on the HMD 200. Alternatively, camera 210 may be positioned below camera 205 on the HMD 200. Otherwise, the cameras 205 and 210 are mounted at the same relative height/vertical position on the HMD 200. Accordingly, from this disclosure, it is clear that the positions and orientations of the cameras 205 and 210 may vary widely.

Now that the configurations for the cameras 205 and 210 have been introduced, the disclosure will turn to how these cameras 205 and 210 may operate. Recall, the stereo camera system/pair (i.e. cameras 205 and 210) are configured to detect light for performing movement detection (e.g., head tracking, hand tracking, object tracking, etc.), as well as depth detection. With regard to head tracking, the stereo camera pair actually constitutes an "inside-out" head tracking system because the stereo camera pair is mounted on the HMD 200.

An "inside-out" head tracking system tracks the position of a HMD (e.g., HMD 200) by monitoring the HMD's position in relation to its surrounding environment. This is accomplished through the use of tracking cameras (e.g., cameras 205 and 210) that are mounted on the HMD itself and that are pointed away from the HMD. In contrast, an "outside-in" tracking system uses cameras or external light illuminators that are mounted in the environment and that are pointed toward the HMD. In this manner, inside-out head tracking systems are distinguished from outside-in head tracking systems.

As shown, cameras 205 and 210 are mounted on the HMD 200 (i.e. the object being tracked) and may be (but are not required to be) slightly oriented away from each other (as shown by the angled orientation of the optical axes 215 and 225). Stated differently, the optical axis 215 is angled in relation to the optical axis 225.

To capture as much of the surrounding environment as possible, camera 205 and camera 210 may be positioned apart, at a preselected distance from each other, and may be angled away from each other. This preselected distance is referred to as a "baseline," and it may be any distance. Commonly, however, the baseline will range anywhere between at least 4 centimeters (cm) up to and including 16 cm (e.g., 4.0 cm, 4.1 cm, 4.2 cm, 4.5 cm, 5.0 cm, 5.5 cm, 6.0 cm, 6.5 cm, 7.0 cm, 7.5 cm, 8.0 cm, 8.5 cm, 9.0 cm, 9.5 cm, 10.0 cm, 10.5 cm, 11.0 cm, 11.5, cm, 12.0 cm, 12.5 cm, 13.0 cm, 13.5 cm, 14.0 cm, 14.5 cm, 15.0 cm, 15.5 cm, 16.0 cm, or more than 16.0 cm or less than 4.0 cm). Often, the baseline is at least 10 centimeters. Sometimes, the baseline is chosen to match the most common interpupil distance for humans, which is typically between 5.8 cm and 7.2 cm. In general, a wider baseline allows for accurate depth from stereo for an increased distance over narrower baseline designs. Other factors that may influence the accuracy of the camera system are the cameras' fields of view and their image resolution.

With the foregoing configuration, the stereo camera system is enabled to capture a large area of the surrounding environment, thus enabling the HMD 200 to interpolate its own position in relation to that environment. In addition to performing head tracking, the HMD 200 (and specifically the stereo camera pair along with the stereo camera pair's logical components) may be re-purposed, or rather multi-purposed, to also perform an improved form of depth detection. By re-purposing existing hardware components, the embodiments significantly reduce the cost for performing depth detection, especially when compared to time-of-flight depth detection systems.

As an initial matter, it is noted that humans are able to perceive "depth" because humans have a pair of eyes that work in tandem. When both eyes are focused on an object, signals from the eyes are transmitted to the brain. The brain is then able to interpolate depth using any disparity existing between the information captured from the two eyes.

Similar to how a human's eyes "focus" on an object when determining depth, the HMD 200 also obtains "focused" digital image content to determine depth. Here, the "focused" digital image content is obtained from camera images that include content corresponding to the overlapping region 235 (i.e. camera 205's image and camera 210's image, both of which include digital content corresponding to the overlapping region 235). In this manner, the cameras 205 and 210 obtain separate images, but these images still have at least some similar content.

Here, an example will be helpful. Suppose a table was located in the HMD 200's environment and that the HMD 200 was positioned so that the table was located within the overlapping region 235. In this scenario, cameras 205 and 210 are each able to obtain a digital image that includes digital content corresponding to the table. Consequently, at least some of the pixels in the image obtained by camera 205 will correspond to at least some of the pixels in the image obtained by camera 210. Specifically, these "corresponding pixels" (i.e. the pixels in the one image that correspond to the pixels in the other image) are associated with the table.

Once these digital images are obtained, then the HMD 200 performs certain transformations (also called "re-projections") on those digital images. These transformations correct for lens distortion and other camera artifacts. Furthermore, the stereo images are re-projected onto a virtual stereo rig where both image planes lie inside a plane that is parallel to the stereo cameras' baseline. After re-projection, corresponding pixels are guaranteed to lie on the same horizontal scanline in left and right images. As a result, two "re-projected" images are formed, one for the image that was obtained by the camera 205 and one for the image that was obtained by the camera 210. Any pixels that are similar/correspond between the two re-projected images now lie on the same horizontal plain.

After the re-projected images are created, the HMD 200 measures any pixel disparity that exists between each of the corresponding pixels in the two images. Because the HMD 200 understands that the corresponding pixels in the two re-projected images are now in the same horizontal plain, the HMD 200 identifies that the disparity between these corresponding pixels corresponds (i.e. is proportional) with a depth measurement. Using this disparity, the HMD 200 assigns a depth value to each pixel, thus generating a depth map for any objects located in the overlapping region 235. Accordingly, the HMD 200, through the use of its multi-purposed head-tracking stereo camera pair, is able to perform both movement detection as well as depth detection.

The remaining portion of this disclosure uses many examples of cameras and head tracking stereo camera pairs (or simply stereo camera pairs). Unless stated otherwise, these cameras may be configured with any of the positional/alignment configurations discussed above. Therefore, regardless of whether the system is performing head tracking and/or depth detection, any of the cameras mentioned above, operating in any of the configurations mentioned above, may be used.

Figure 3:
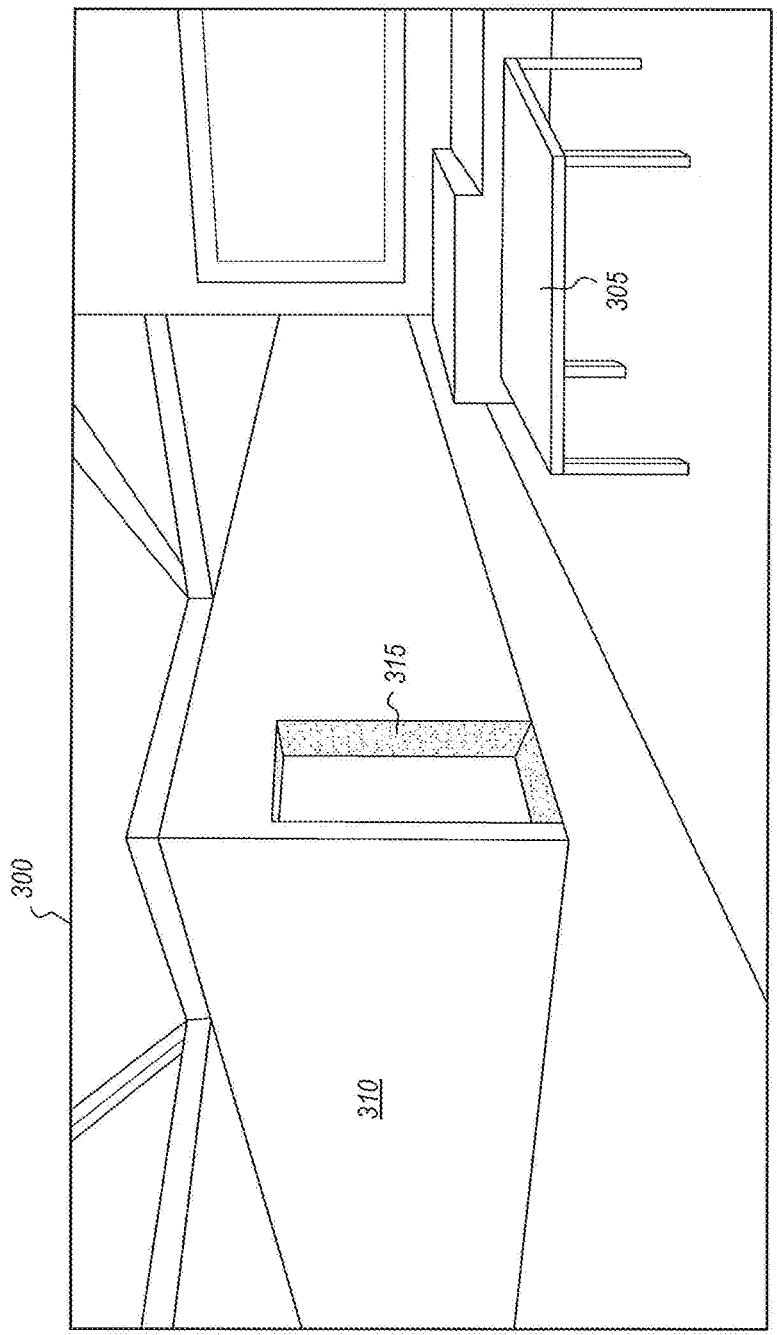
FIG. 3 shows an example environment in which the HMD may be used, and this example environment includes some objects that have textureless/smooth surfaces.

With that understanding, attention will now be directed to FIG. 3. In this illustration, an example environment 300 is provided, which may be presented to a user (e.g., user 105 from FIG. 1) who is using a HMD (e.g., HMD 110 from FIG. 1 or HMD 200 from FIG. 2) to visualize a mixed-reality environment.

Environment 300 includes a number of different features and objects. For example, environment 300 includes a textureless/smooth table top 305, a textureless/smooth wall 310, and a textured door frame 315, just to name a few. Of course, this is just one example of what an environment may look like, and thus should not be considered limiting or otherwise binding.

One problem that conventional depth perception systems have faced is determining depth for "textureless/smooth" objects (e.g., the textureless/smooth table top 305 and the textureless/smooth wall 310). For textured surfaces, like the textured door frame 315, traditional depth detection systems are usually able to capture enough details to perform the stereo matching between the left and right cameras to adequately gauge the depth of those textured objects. Unfortunately, however, traditional depth detection systems are very inadequate in determining the depth of textureless/smooth objects. In particular, traditional depth detection systems cannot collect enough information to adequately distinguish one part of the textureless/smooth object from another part, which may be further away.

For instance, if a user were to stand near the textureless/smooth table top 305, portions of the textureless/smooth wall 310 will be significantly closer than other portions of the textureless/smooth wall 310. However, traditional systems are unable to account for this change in depth because of a lack of texture on the surfaces and, hence a lack of reflected light that is used to determine the depth. As a result, traditional systems will often generate a false or otherwise misleading depth map for textureless/smooth objects like textureless/smooth wall 310. If any virtual content is dependent on that false depth map, then clearly the mixed-reality environment will be skewed and thus the user's experience will be hampered.

To address the above problems, some of the disclosed embodiments beneficially project, or rather add, texture to the environment. In some implementations, this texture is in the form of an infrared (IR) dot-pattern illumination. Because the HMD's stereo camera pair (e.g., camera 205 and 210 from FIG. 2) is sensitive to both visible and infrared (IR) light, the stereo camera pair is able to detect the added texture and compute proper depth for any kind of object, even a textureless/smooth object. The HMD is thereby provided a picture with structured light, thus improving depth quality determinations. Other possible implementations could combine visible light dot-pattern projectors with cameras that only capture visible light or IR dot projectors with cameras that only capture IR light.

Figure 4:
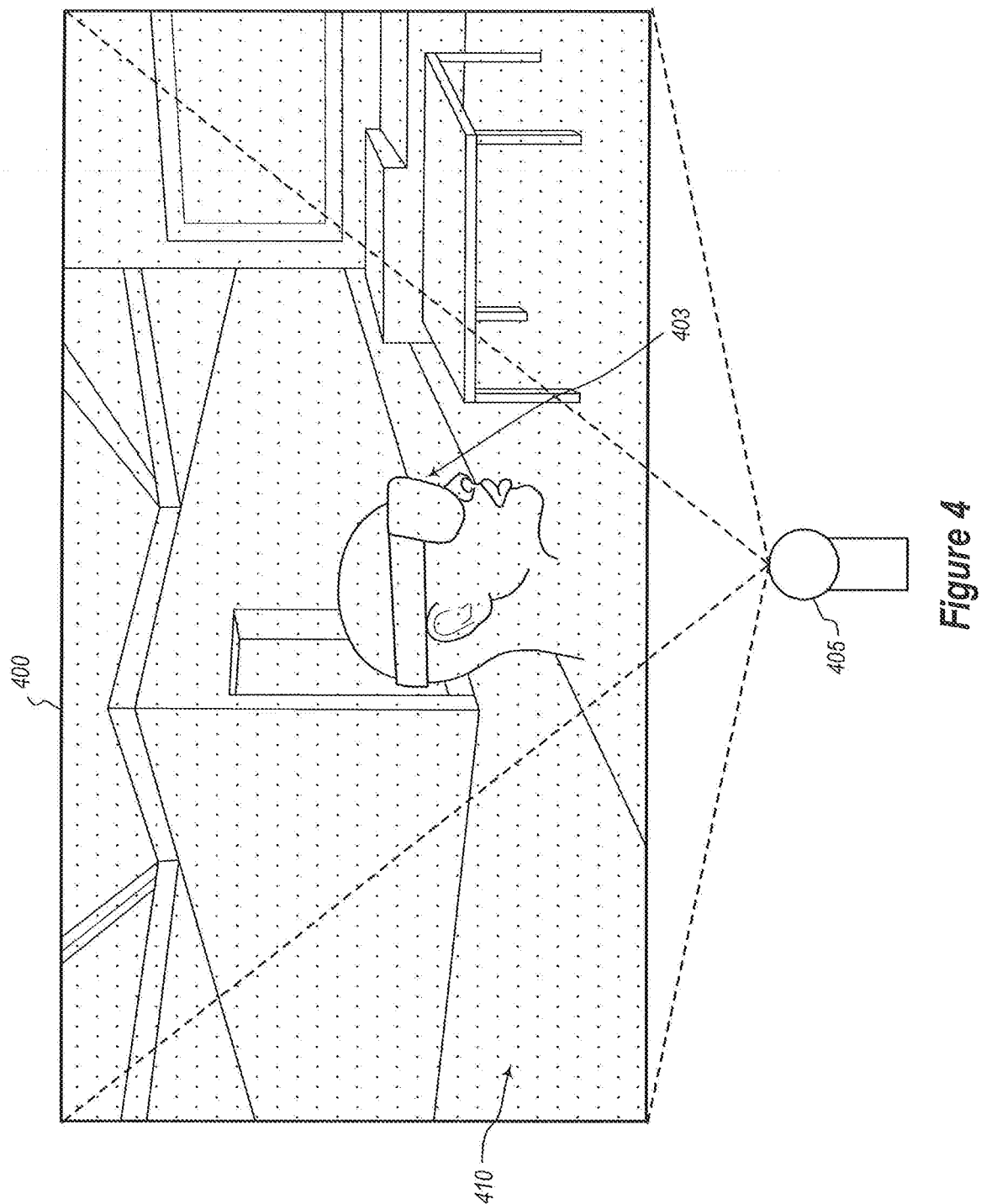
FIG. 4 demonstrates a projector projecting an IR dot pattern illumination into a HMD's surrounding environment

Attention is now directed to FIG. 4. In this illustration, an IR projection pattern illuminator 405 projects/disperses IR light as an IR dot-pattern illumination 410 into the surrounding environment 400 of a HMD 403 in order to project, or rather add "texture" to object surfaces in the surrounding environment 400. This IR dot-pattern illumination 410 may be projected to any predetermined illumination area within the HMD 403 surrounding environment 400 (e.g., any area in the environment 300 from FIG. 3). By way of non-limiting example, the IR projection pattern illuminator 405 may be configured to project/disperse IR light in $$\frac{\pi}{2}, \pi, \frac{3\pi}{2}, 2\pi, \frac{5\pi}{2}, 3\pi, \frac{7\pi}{2},$$

or 4π steradians, in any direction into the environment 400.

Although, FIG. 4 only shows a single IR projection pattern illuminator 405 being used to project the IR dot-pattern illumination 410, it will be appreciated that two or more IR projection pattern illuminators may be utilized in at least some of the disclosed embodiments, (see FIG. 8), which are physically untethered from the HMD 403. It will also be appreciated that an IR projection pattern illuminator 405 may also include any combination of IR light emitting diode (LED), LED array, IR laser diode, incandescent discharge illuminator, vertical-cavity surface-emitting laser (VCSEL) and/or plasma discharge illuminator.

The IR dot-pattern illumination 405 may be generated in various ways. For instance, in a preferred embodiment, the IR dot-pattern illumination 405 is generated using a diffraction limited laser beam, a collimating optic, and a diffractive optical element (DOE) (aka an optical diffuser). As such, the IR dot-pattern illuminator 400 may also include a collimating optic and a DOE to provide the desired projection/dispersion of the IR dot-pattern illumination 405. When an IR laser shoots a diffraction limited laser beam of IR light into the DOE, then the DOE disperses the IR light in such a manner so as to project the pre-configured dot pattern illumination. Other IR LED, incandescent discharge illuminator, VCSEL, plasma discharge illuminator, etc., may be used with more traditional imaging and re-projection techniques as well.

In an alternative embodiment, an etched lens may also be placed over top of an IR optical source/illuminator. In a first example, individual dots may be etched onto the lens to create the dot pattern. When the dot-pattern illuminator 400's IR laser emits a beam of IR light through this type of lens, the IR light unimpededly passes through the lens in the areas that were not etched. However, for the dot areas that were etched, the IR light may be impeded in accordance with the etched pattern, thus projecting a dot pattern into the surrounding environment.

In a second example, large swatches may be etched onto the lens while avoiding small "dot" areas that correspond to the dot pattern. When the IR laser emits a beam of IR light through this type of lens, only IR light that passes through the small unetched "dot" areas will pass unimpededly, thus projecting a dot pattern into the surrounding environment. Any other technique for generating a dot pattern may also be used (e.g., instead of etching the lens, a dot-pattern covering may be placed on the lens). Additionally, any other DOE may be used to disperse IR light in accordance with a pre-configured dot pattern. Regardless of its implementation, a beam of IR light is dispersed according to a predetermined dot-pattern.

While the disclosure has used the phrase "dot pattern," it will be appreciated that the term "dot" does not limit the illuminations to a circular shape. In fact, any shape of dot may be projected in the predetermined dot-pattern. For example, the dot pattern may include a pattern of circles, triangles, squares, rectangles and/or any other polygon or oval shaped dot(s).

It will also be appreciated that any kind of dot "pattern" may be used. For instance, the pattern may be a completely random assortment of dots. Alternatively, the pattern may include a pre-configured pattern that repeats itself in a horizontal and/or vertical direction. By repeating the dot pattern at least in the vertical direction, advantages are realized because the efficiency of the stereo matching algorithm will be improved. Even further, the size of the dots may also vary such that some dots may be larger or smaller than other dots to facilitate pattern matching.

As described herein, the IR dot pattern illumination 410 is projected into the surrounding environment of a HMD 403 in order to project, or rather add, "texture" to object surfaces in the surrounding environment 400. In implementations where the HMD 403 includes a stereo camera system, the overlap of the IR dot pattern illumination 410 with the field of view region of the stereo camera system enables both of the HMD 403's cameras to detect at least a part of the IR dot pattern illumination 410 being reflected off of objects in the overlapping field of view region. In this manner, the cameras are able to obtain digital images that include digital content corresponding to the texture (i.e. the "obtained" texture is actually reflected IR light generated as a result of the IR dot pattern illumination 410 reflecting off of surfaces in the environment 400). Using the digital content corresponding to the texture, the HMD 403 is able to compute pixel disparity, thus determining depth of objects (even smooth objects) in the overlapping field of view region. In some instances, because the stereo cameras 205 and 210 are sensitive to both IR light and visible light, the digital images obtained by the cameras include IR dot pattern illumination reflections (for smooth objects) in addition to readily identifiable features (for textured objects) which do not require IR illumination for depth calculation.

Additionally, or alternatively, in some embodiments the one or more cameras of the HMD 403 may utilize the reflections of the IR dot pattern illumination 410 light as anchor points to make tracking of the HMD more robust. This is particularly beneficial in low-light environments, as described hereinbelow.

Figure 5:
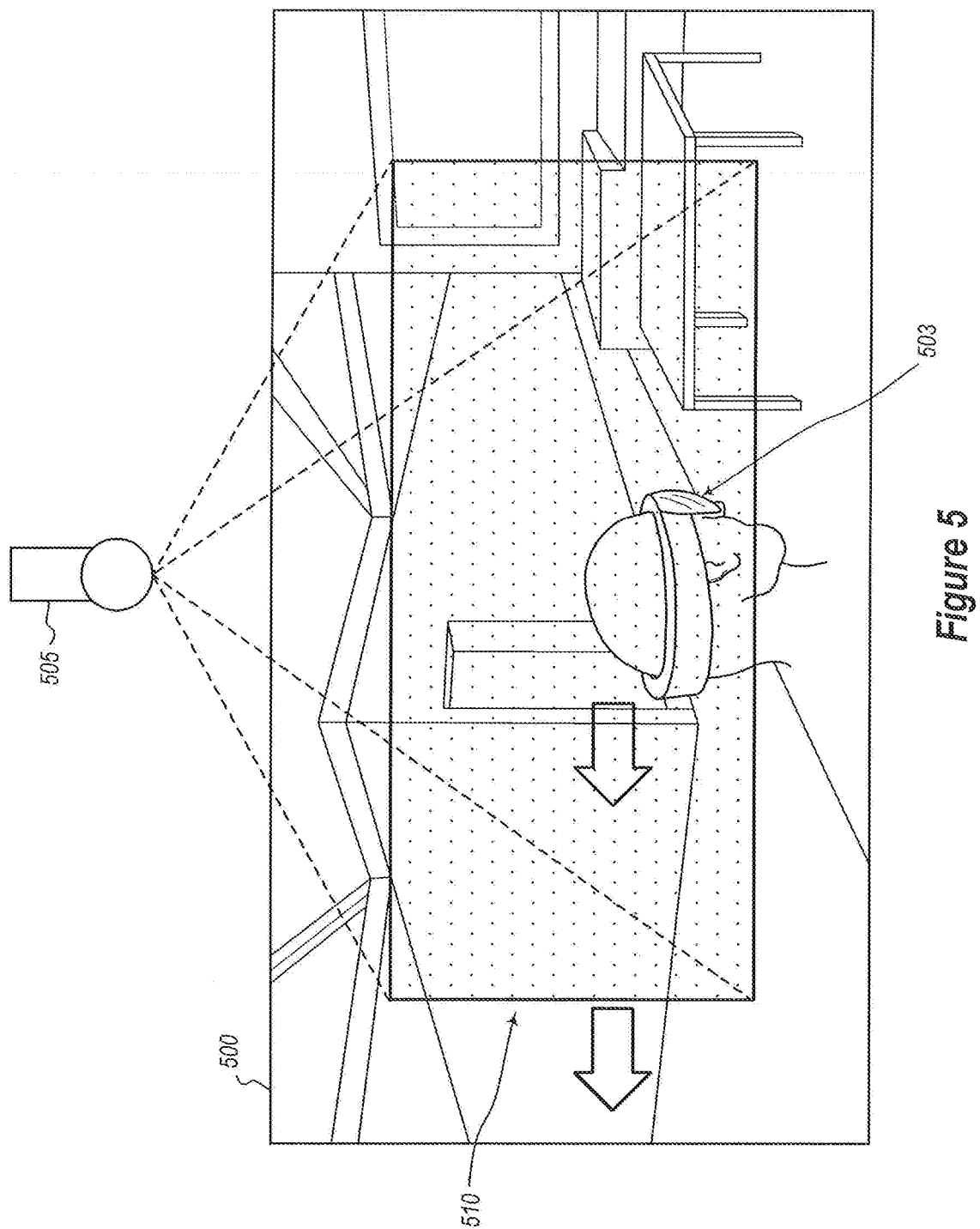
FIG. 5 shows a projector projecting an IR dot pattern illumination into a HMD's surrounding environment based at least in part on characteristics (e.g., pose and/or motion) of the HMD.

Attention is now directed to FIG. 5. This FIG. 5 illustrates an IR projection pattern illuminator 505 configured to project an IR dot pattern illumination 510 that selectively illuminate portions of an environment 500 surrounding an HMD 503 based on certain criteria. As illustrated, the IR dot pattern illumination 510 projected by IR projection pattern illuminator 505 is substantially rectangular in shape. This arrangement is illustrative only, and it will be appreciated that an IR projection pattern illuminator 505 may be configured to project an IR illumination in a variety of shapes and manners. By way of example, the IR projection pattern illuminator 505 may be configured to project a $$\frac{\pi}{2}$$

steradian IR dot pattern illumination to illuminate a circular region.

In some embodiments, the IR projection pattern illuminator 505 receives and/or generates (e.g., via a processor based on data received) instructions which dictate the manner in which the IR projection pattern illuminator 505 will emit an IR dot pattern illumination 510. The data received may arise from a communication (wireless or wired) between the HMD 503 and the IR projection pattern illuminator 505, from other external sensors, from sensors attached to the IR projection pattern illuminator, or from other sensors or sources, as will be discussed in another part of this disclosure.

As mentioned, the IR projection pattern illuminator 505 may utilize the received and/or generated instructions from the HMD or a third party system to determine the characteristics of the IR dot pattern illumination 510 to be projected. The characteristics of the IR dot pattern illumination 510 to be projected may be based on a variety of criteria. For example, as illustrated in FIG. 5, the IR projection pattern illuminator 505 may wirelessly receive data indicating motion data for the HMD 503. For example, the data may indicate that the HMD 503 is being turned to the left (according to the illustrated arrow proximate the HMD 503), as illustrated, which consequently indicates that the fields of view of any cameras attached to the HMD 503 will also turn to the left. In response to the received data, the IR projection pattern illuminator 505 adjusts the region upon which the IR dot pattern illumination 510 is projected to correspond with the changing field of view of any cameras attached to the HMD 503.

In addition to adjusting the direction and/or size of the region upon which the IR dot pattern illumination 510 is projected, the IR projection pattern illuminator 505 is, in some embodiments, configured to adjust the illumination strength of the IR dot pattern illumination 510 (e.g., the intensity of the emitted light). In other embodiments, data indicating which particular surfaces in the environment 500 are perceived as lacking in features with which to perform active stereo depth computations (e.g., flat) is utilized by the IR projection pattern illuminator 505 to selectively illuminate only those portions of the environment 500 and/or increase a density of textured dot pattern light projected to those portions that lack necessary features for performing active stereo depth computation with the HMD.

In yet another embodiment, the IR projection pattern illuminator 505 senses that the ambient lighting in the environment 500 (or, for example, the number of detectable anchor points) has reduced below a predetermined threshold. In response to this detection, the IR projection pattern illuminator 505 increases the illumination strength (e.g., intensity of emitted light), and/or enters an IR flood projection mode, as described in more detail below.

In another embodiment, the HMD determines that an efficiency of performing stereo depth computations is dropping below a threshold value, due to a lack of detectable/textured features in the surrounding environment (based on analyzing images obtained with the HMD camera system). In response to this determination, the HMD communicates instructions to the projector to modify the illumination pattern, by changing at least one of: a direction for projecting the illumination pattern, an intensity of the illumination pattern or a density or configuration of the illumination pattern.

The exemplary criteria herein described merely illustrate a few of the possible criteria upon which the IR projection pattern illuminator 505 may base alterations to the IR pattern projection being emitted thereby. Other criteria exist which are not specifically addressed in this disclosure (e.g., the capture rate of one or more sensors in the system).

The disclosure has focused on structured projection patterns including dot patterns and variants thereon. The structured projection patterns described herein may also be varied as to their fill rate, or the percentage of space in the IR projection region that will be illuminated. IR projection pattern illuminators may be designed with a fill rate of 10%, 20%, 30%, 40%, 50%, 60%, 70%, 80%, 90%, or 100%. A fill rate of 100% corresponds to a flood of IR light, which is particularly advantageous in circumstances with low ambient light.

A discussion on ambient light is pertinent. For reference, a bright sunny day typically has an ambient light intensity of around 10,000-50,000 lux. An overcast day typically has an ambient light intensity of around 1,000-10,000 lux. An indoor office typically has an ambient light intensity of around 100-300 lux. The time of day corresponding to twilight typically has an ambient light intensity of around 10 lux. Deep twilight has an ambient light intensity of around 1 lux. As used herein, the illustrated low light environment 1300 least corresponds to any environment in which the ambient light intensity is at or below about 40 lux.

In certain embodiments, an IR projection pattern illuminator relies on one or more sensors to determine whether a low-light environment exists. These sensors may be located, for example, on the HMD, on the IR projection pattern illuminator itself, or at any location in the environment.

Figure 6:
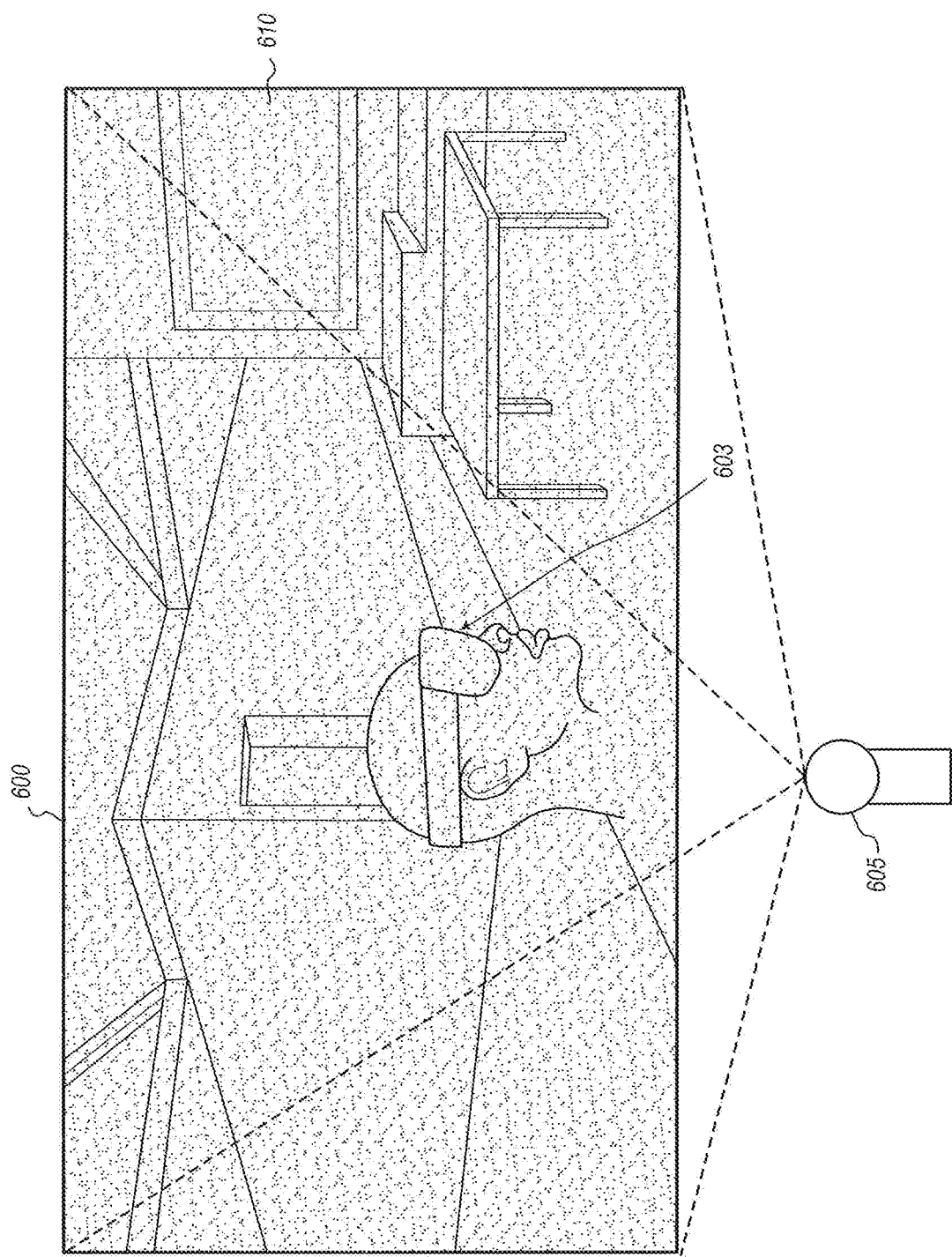
FIG. 6 illustrates a projector projecting an IR flood illumination into a HMD's surrounding environment.

FIG. 6 illustrates an IR projection pattern illuminator 605 emitting a flood of IR light 610 into a low-light environment 600 surrounding a HMD 603. As used herein, the IR projection pattern illuminator 605 includes one or more of an IR LED, an array of IR LEDs, an IR laser diode, an incandescent discharge illuminator, a VCSEL, a plasma discharge illuminator, etc. The IR projection pattern illuminator 605 also includes, in some embodiments, a corresponding collimating optic. The IR illuminator is configured to emit a broad-beamed, homogeneous ray of light that spans a large illumination area. By "homogeneous," it is meant that all illumination points are subjected to substantially the same amount of light.

In this manner, the flood IR illuminator 1305 is configured to emit a flood of IR light spread across a selected field of view that at least partially illuminates the head tracking camera's FOV. This field of view may be spanned differently. For example, the field of view may span 90 degrees, 100 degrees, 110 degrees, 120 degrees, 130 degrees, and so on. Additionally, the flood IR illuminator 1305 may be but one of an array of multiple illuminators.

In some circumstances, the IR projection pattern illuminator 605 always emit a flood of IR light 710 while the HMD 703 is actively generating a mixed-reality environment. In other circumstances, the IR projection pattern illuminator 605 is triggered to turn on only when a particular condition occurs.

Examples of triggering conditions include, but are not limited to, (1) a detection (either by the HMD 703's camera(s) or by an ambient light sensor of the HMD) that the ambient light intensity of the surrounding environment has fallen below a threshold intensity value (e.g., 40 lux) and/or (2) a determination that the number of detectable/detected anchor points is below a preselected number of anchor points (e.g., 6, 7, 8, 9, 10, 15, 20, 25, 30, 35, 40, 45, 50, 55, 60, 90, 100, 200, etc. anchor points).

As shown in FIG. 6, the IR projection pattern illuminator 605 is emitting a flood of IR light 610 into the environment 600. Such a process is particularly beneficial for helping to illuminate potential anchor points that may be used to track movements and to thereby facilitate identification of the anchor points by the HMD when sensing reflected light from the anchor points.

Figure 7:
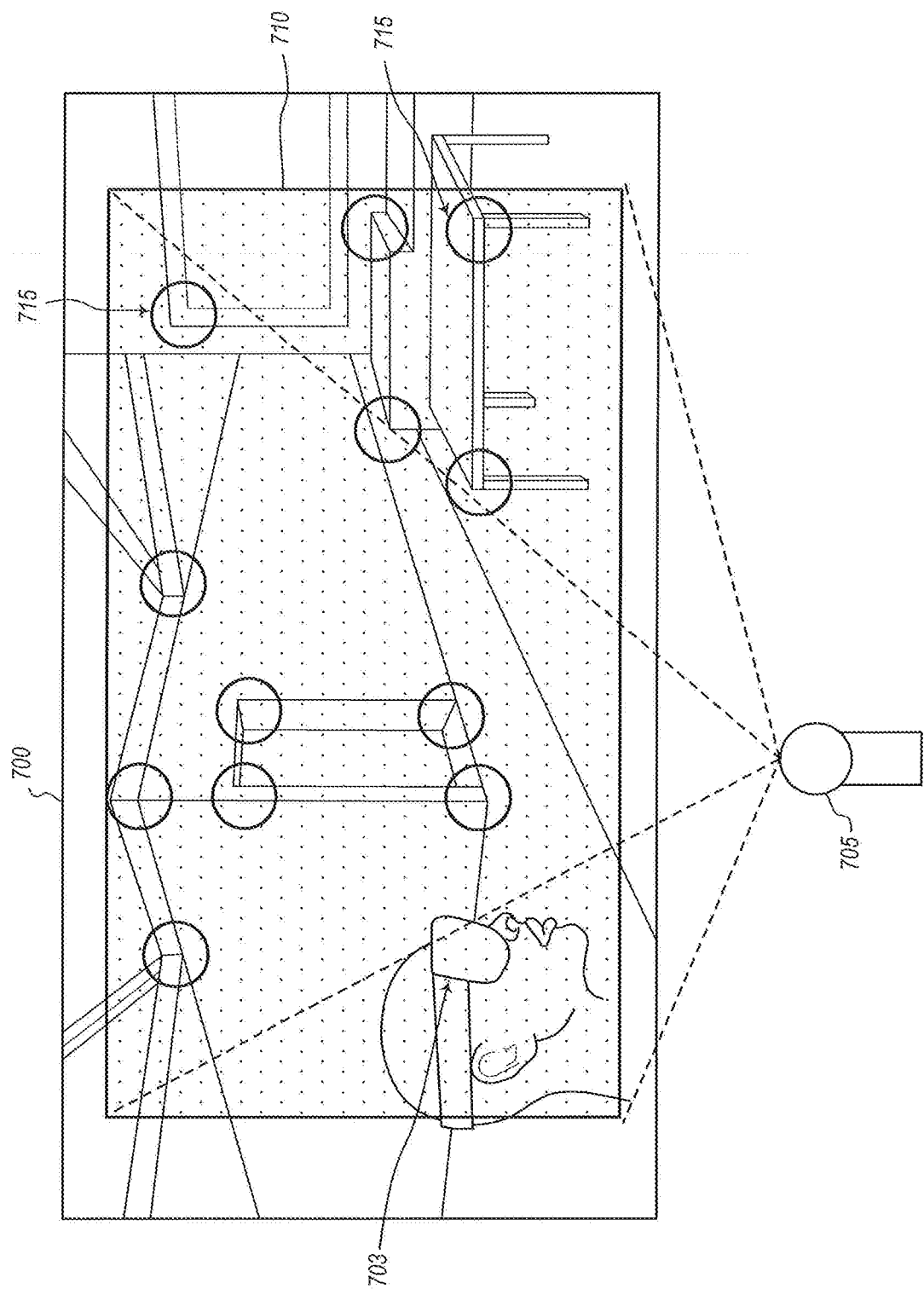
FIG. 7 demonstrates a projector projecting an IR flood illumination into a HMD's surrounding environment, with attention drawn to anchor points to be utilized by the HMD to track motion of the HMD.

Such a scenario is shown in FIG. 7 (the illustration of the flood of IR light 710 is relaxed compared to the illustration of the flood of IR light 610 in FIG. 6, so as to better draw attention to the anchor points 715 herein described). It will be appreciated that the camera(s) of HMD 703 are able to detect both visible light and IR light. In some instances, the cameras capture images of reflected IR light and use these IR light images to detect anchor points in any kind of environment, even in low light environments. It will be appreciated that the camera system of the HMD may include any number of cameras (e.g., 1, 2 or more cameras) that are able to (collectively or individually) sense only visible light, only IR light or a combination of both IR light and visible light.

As shown in FIG. 7, the HMD 703 is able to detect a vast array of different anchor points 715 by sensing reflected IR light and/or visible light. These anchor points 715 are symbolically identified through the use of the dark circles. In some scenarios, these anchor points are fixed physical features, such as corners, that are useful for determining the HMD 703's position and orientation in relation to its surrounding environment. It will be appreciated that, in a low-light environment, the anchor points 715 are made more readily ascertainable to the cameras on the HMD 703 by the flood of IR light 710 projected by the IR projection pattern illuminator 705. Accordingly, with a greater number of ascertainable anchor points 715, the HMD 703 is able to utilize the anchor points 715 as a reference for tracking the movement of the HMD 703, even in low-light environments.

The disclosure thus far has focused on embodiments including one IR projection pattern illuminator. It will be appreciated, however, that implementations including more than one IR projection pattern illuminator are within the scope of this disclosure. It will also be appreciated that, in some embodiments, the IR projection pattern illuminator is configured to additionally or alternatively project visible flood light and/or structured light patterns (e.g., a dot pattern).

Figure 8:
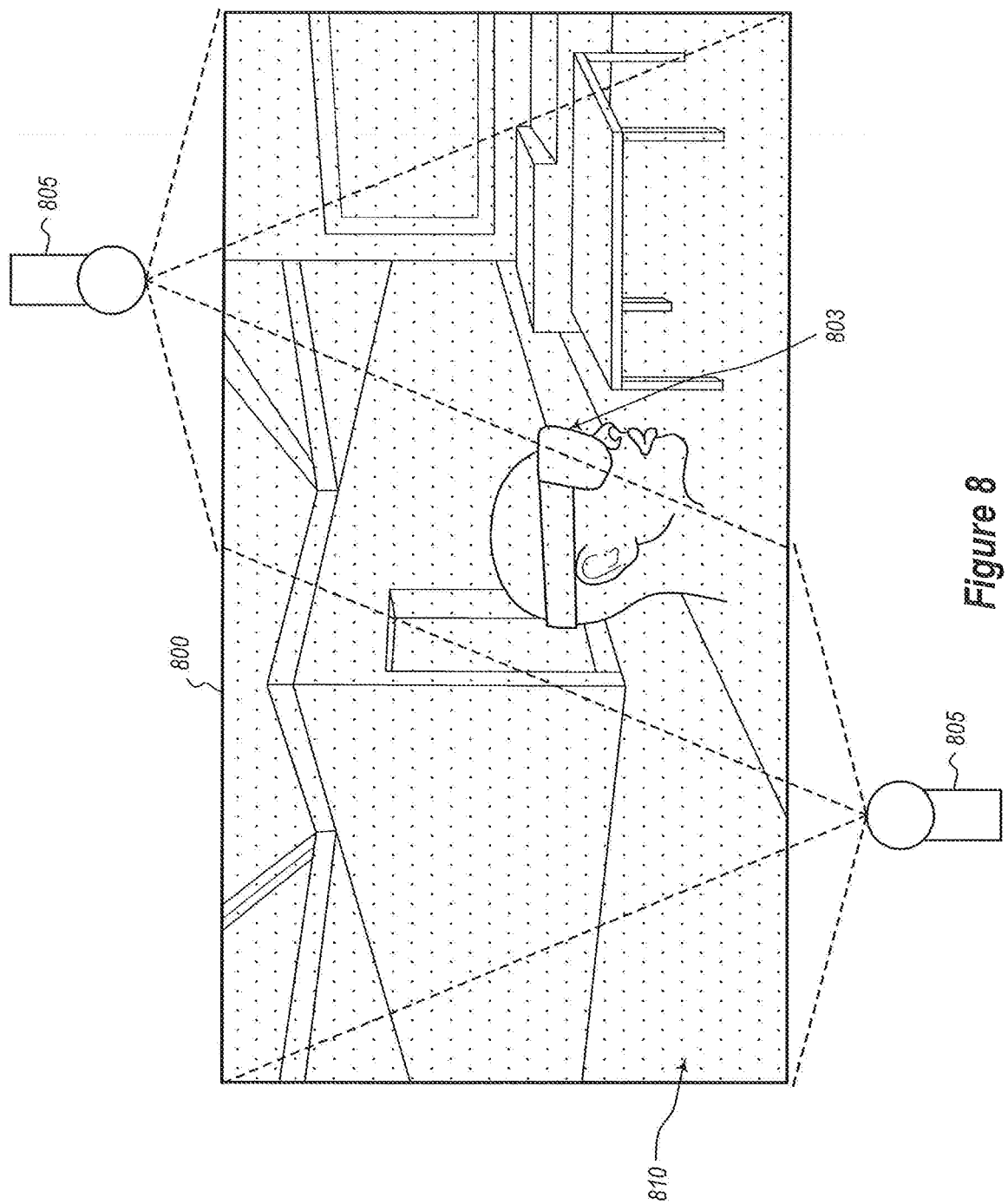
FIG. 8 portrays an example in which more than one projector works in concert to project IR light into an environment surrounding a HMD.

Attention is now directed towards FIG. 8, which illustrates two IR projection pattern illuminators 805 projecting an IR dot pattern illumination 810 onto an environment 800 surrounding a HMD 803. As illustrated, the dot pattern illumination is projected in part by a first IR projection pattern illuminator 805 in one position (depicted in the lower-left portion of FIG. 8) and in part by a second IR projection pattern illuminator 805 in another position (depicted in the upper-right portion of FIG. 8).

In some embodiments, the IR projection pattern illuminators 805 are configured to illuminate only a portion of the environment 800. Alternatively, in other embodiments, both of the IR projection pattern illuminators 805 are able to illuminate the entire environment 800, thereby overlapping their projected illumination areas. Each of the IR projection pattern illuminators 805 are also able, in some embodiments, to selectively illuminate limited portions of the environment 800 based on any predetermined criteria (e.g., HMD pose data, detected environmental shadowing, lack of detected anchor points, user attention directed to a particular area of the environment, etc.), regardless of whether the projected illuminations are overlapping or not.

Additionally, or alternatively, the IR projection pattern illuminators 805 may also utilize criteria which enable the IR projection pattern illuminators 805 to ensure that the IR dot pattern illumination light reaches the desired object(s) in the environment 800 surrounding the HMD 803. When a HMD user's body or other object stands between an IR projection pattern illuminator 805 and one or more objects in an environment 800, the IR dot pattern illumination light may be occluded or otherwise impeded from reaching objects to be mapped. Accordingly, in such a scenario, the one or more cameras attached to the HMD 803 may be unable to detect any "texture" that would have been added by the IR dot pattern illumination to the object(s).

For example, turning to FIG. 8, the user of HMD 803 may be positioned between the lower-left IR projection pattern illuminator 805 such that light from that illuminator 805 does not reach the table depicted. Without an additional illuminator, any cameras attached to the HMD 803 would be unable to detect any "texture" that would have been added by the IR dot pattern illumination to the table, and thus the HMD 803 would be unable to determine a depth map for flat surfaces of the table.

To solve this problem, in some embodiments, two or more IR projection pattern illuminators 805 are utilized such that even when a user's or other object's position would obstruct one IR projection pattern illuminator, the second will compensate for the obstruction by providing the IR dot pattern illumination from a different location/projector. Returning to the aforementioned example in FIG. 8, when the HMD 803 user's body prevents light from the lower-left IR projection pattern illuminator 805 from reaching the table, the upper-right IR projection pattern illuminator 805 is configured to illuminate the table. Accordingly, a stereo camera pair attached to HMD 803 is still able to detect additional "texture" on the table and determine a depth map for flat surfaces of the table according to the present disclosure.

It will be appreciated that IR projection pattern illuminators 805 may be configured to communicate with the HMD 803, or with each other, to coordinate and/or alter their IR dot pattern illumination projections 810, as described hereinabove. For example, the HMD 803 may transmit pose data to the IR projection pattern illuminators 805, which will cause the illuminators to illuminate portions of the environment 800 that correspond to the fields of view of the stereo cameras of the HMD 803. In some instances, this will involve only one IR projection pattern illuminator 805 becoming activated. In other instances, both IR projection pattern illuminators will become activated. In yet other instances, one IR projection pattern illuminator will project IR light with a different intensity than the intensity used by the second illuminator.

As briefly introduced earlier, any of the IR dot-pattern illuminators and/or the flood IR illuminators may be synchronized with the exposure periods of one, some, or all of the HMD's cameras. In this manner, the IR dot-pattern illuminators and/or the flood IR illuminators may operate in a pulsed or staggered mode. While in this mode, the IR illuminators (e.g., the IR dot-pattern illuminators and/or the flood IR illuminators) are able to selectively emit IR light during times corresponding to the cameras' exposure periods and not emit light during times when the cameras' are not sensing light. Such configurations are beneficial because they help preserve or prolong the HMD's battery lifespan. Accordingly, any of the IR illuminators may be time synchronized with any of the HMD's cameras.

Figure 9:
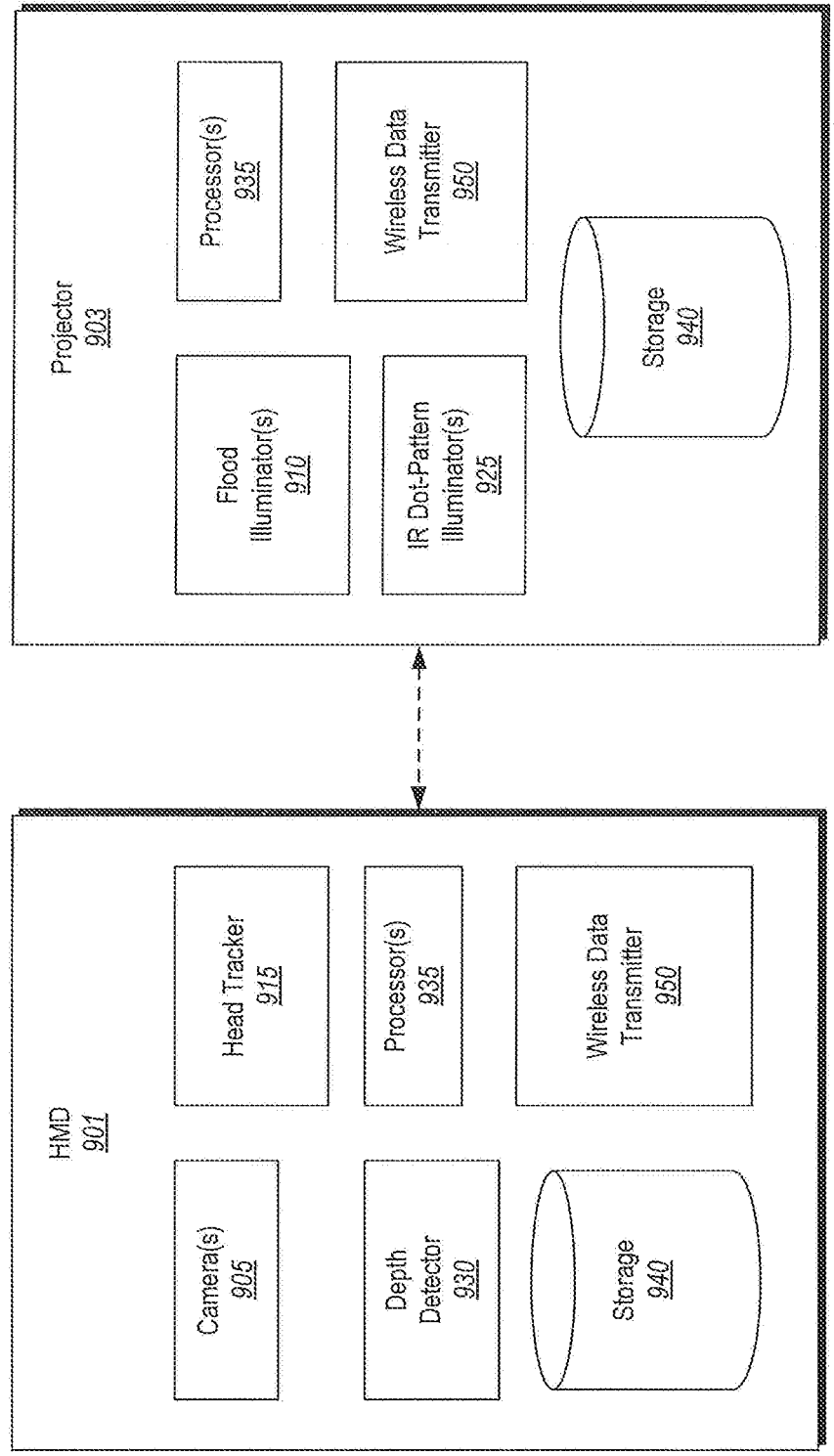
FIG. 9 shows an example of head tracking and depth detector system components which components may be used to perform head tracking and depth detection using visible light and/or IR light.

Attention is now directed to FIG. 9, which illustrate various example computer system components that may be utilized to improve depth detection with stereo tracking cameras and/or head tracking. The illustrated HMD computer system components 901 may be integrated into a HMD. For instance, these components may be part of the HMD 200 that was discussed in connection with FIG. 2 or any of the other HMDs discussed thus far.

As shown, the HMD computer system components 901 include camera(s) 905 which may be an example implementation of the left camera 205 and the right camera 210 from FIG. 2 or any of the other cameras discussed herein.

The HMD computer system components 901 also include a head tracker 915 and a depth detector 930, as well as one or more processors 935 and storage 940. The one or more processors 935 include hardware processors, each of which may be a specially configured processor (e.g., a graphics processing unit ("GPU") or as an application specific integrated circuit ("ASIC")).

In some instances, the processor(s) 935 include one processor that is configured to operate as the head tracker 915 and an additional processor that is configured to operate as the depth detector 930. Alternatively, a single processor is used to operate as both the head tracker 915 and the depth detector 930. More details on processors and how they operate will be provided in connection with FIG. 12. Additionally, the head tracker 915 and the depth detector 930 will be described in more detail in conjunction with the methods illustrated in FIGS. 10 and 11. The processor(s) 935 also execute stored computer-executable instructions stored in the storage 940 for implementing the acts described herein.

FIG. 9 also illustrates various projector computer system components 903, including one or more IR dot pattern illuminators 925 and one or more IR flood illuminators 910, both of which are example implementations of the IR projection pattern illuminator 405 from FIG. 4 or any of the other IR projection pattern illuminators discussed herein.

Additionally, the projector computer system components also include one or more processors 935 and storage 940. In some instances, the processor(s) 935 include one processor that is configured to operate IR dot pattern illumination and an additional processor that is configured to operate IR flood illumination. Alternatively, a single processor is used to operate both IR dot pattern and IR flood illumination. Furthermore, the processor(s) 935 are, in some instances, configured to adjust the IR projection pattern illumination according to certain criteria (e.g., pose of the HMD).

Both the HMD computer system components 901 and projector computer system components 903 include a wireless data transmitter 950. This enables data communication between the HMD computer system components 901 and the projector computer system components 903 (as denoted by the dashed line between the HMD computer components 901 and the projector computer components 903), even for configurations in which the HMD computer system/components 901 are untethered from (e.g., not wired to) the projector(s)/components 903. Accordingly, data may be transferred between the two computer systems to fulfill the objectives of the embodiments herein described (e.g., dynamic adjustment of the IR projection pattern illumination). More details on the operation of the wireless data transmitters 950 will be provided in connection with FIG. 12.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
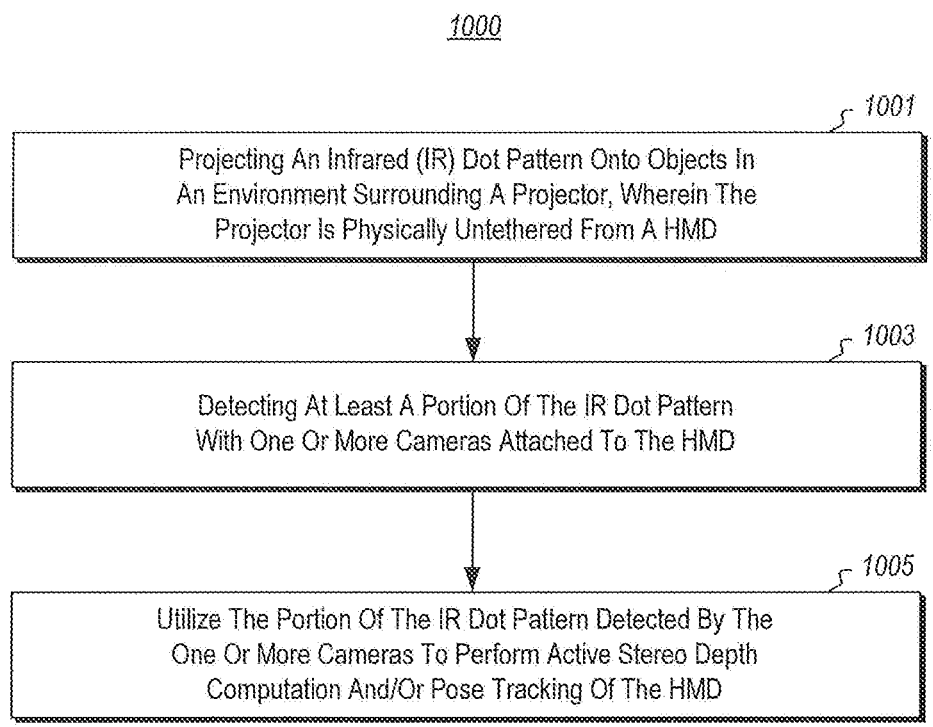
FIG. 10 provides a flow diagram representing a method for performing depth detection with a HMD and projector which are physically untethered from one another.

As shown in FIG. 10, a flowchart 1000 is provided with various acts associated with methods for adding predetermined texture to objects located within an environment of a HMD. The first illustrated act is an act for projecting an IR dot pattern illumination from projector that is physically untethered from a HMD (act 1001), such as a projector that is mounted in the environment surrounding the HMD. For reference, this act may be performed by the projector 903 from FIG. 9.

In some embodiments, the HMD initially uses its cameras to detect an amount of reflected IR light generated as a result of the IR projection pattern illuminator emitting the IR dot-pattern illumination and/or an amount of reflected visible light. In response to a detected "intensity" of the reflected IR light and/or ambient light, which intensity may be detected using the cameras, the HMD modifies a power level of the IR projection pattern illuminator until a predetermined threshold intensity of the reflected IR light is detected by the cameras. As such, the HMD is able to dynamically modify/adjust the power level of the IR projection pattern illuminator in order to increase or decrease the intensity of the IR light, when necessary (e.g., in low light conditions) to obtain a desired level of detail in the captured images used for depth detection and/or tracking. Such adjustments are particularly beneficial for enabling the HMD to use only as much power as necessary in obtaining sufficiently adequate images for determining depth. The modifications may also include modifying a pattern configuration and/or projection area for the illumination pattern and/or a type of illumination (e.g., quantity of IR light vs. visible light being emitted).

Returning to FIG. 10, reflected IR light and/or reflected visible light is subsequently detected (act 1003). This act is performed by the cameras 205 and 210 described in FIG. 2 and throughout this paper. Notably, this reflected IR light is generated as a result of at least a portion of the IR dot-pattern illumination reflecting off of the surface in the environment (e.g., the smooth table top from FIG. 4).

To detect this reflected IR light and/or reflected visible light, a first image, which includes digital content corresponding to a first part of the IR dot-pattern illumination and/or the reflected visible light, is captured using one of the cameras. Concurrently with that operation, a second image is also captured using the second camera. The second image includes digital content corresponding to a second part of the IR dot-pattern illumination and/or the reflected visible light and which includes digital content corresponding to at least some of the same IR dot-pattern illumination and/or visible light that was captured in the first image.

The first image and the second image are then used to determine a depth for at least the common part of the illumination area that was captured in both images (act 1005). By obtaining images of the reflected IR light and/or reflected visible light using both a left camera and a right camera, the HMD is able to measure the pixel disparity present between common pixels in the two images. This pixel disparity may then be used by the depth detector 930 of FIG. 9 to determine the stereoscopic depth for that object.

Notably, HMD is able to determine a depth for objects in the environment, even when those objects have smooth surfaces because of the IR dot-pattern that adds texture to the objects. By determining the depth for objects in this manner (i.e. stereo vision), it is not necessary to utilize additional hardware/components to perform time-of-flight computations. For reference, time-of-flight systems are much more expensive because they use additional hardware components. In contrast, the current embodiments re-purpose many existing components so that they can perform new or additional functionalities, thus saving significant costs and thereby reducing computational and power burdens on the HMDs.

It will be appreciated that the application and use of an IR projection pattern illuminator can significantly improve the manner in which depth detection occurs for HMDs, and while reducing costs of the HMDs (e.g., by reducing resource competition and resource allocation issues). Such processes are also particularly beneficial when the environment surrounding the HMD includes smooth surfaced objects.

FIG. 11 illustrates a flowchart 1100 of various acts associated with methods for tracking movements of a HMD in any kind of environment, including low light environments. Similar to the methods described in reference to FIG. 10, the methods of FIG. 11 may be performed by the HMD computer system components 901 and the projector computer system components 903 shown in FIG. 9.

The first illustrated act is an act of emitting a flood of light from a projector that is physically untethered from the HMD (act 1101). This act may be performed by the projector 903 from FIG. 9, for example. This light may include any combination of IR light and/or visible light.

Next, reflected light is detected (act 1103). This reflected light may include any combination of reflected IR pattern light and visible light. The light is sensed by the HMD camera system, such as camera(s) 905 from FIG. 9. In some embodiments, the light is detected by a HMD's head-tracking stereo camera pair. Based on the detected light, a position of the HMD is determined (act 1105). This act may be performed by the head tracker 915 of FIG. 9, for example. Detecting the position of the HMD may be performed in the manner described above in reference to the inside-out camera detection techniques.

Therefore, by incorporating the use of one or more illuminators, including one or more IR pattern illuminator(s) and/or visible light illuminator(s), the HMD is able to better track movements within any kind of environment, including low light environments.

It will further be appreciated that the HMD is capable of recognizing an IR dot pattern illumination and other visible light reflections as a plurality of anchor points fixed to elements of the environment surrounding the HMD. Accordingly, those skilled in the art will recognize that projecting an IR dot pattern illumination with an IR projection pattern illuminator in an environment surrounding a HMD may augment other tracking processes performed by the HMD for simultaneously allowing for active stereo depth computations with as well as improved head tracking by the HMD.

Example Computer System

Figure 12:
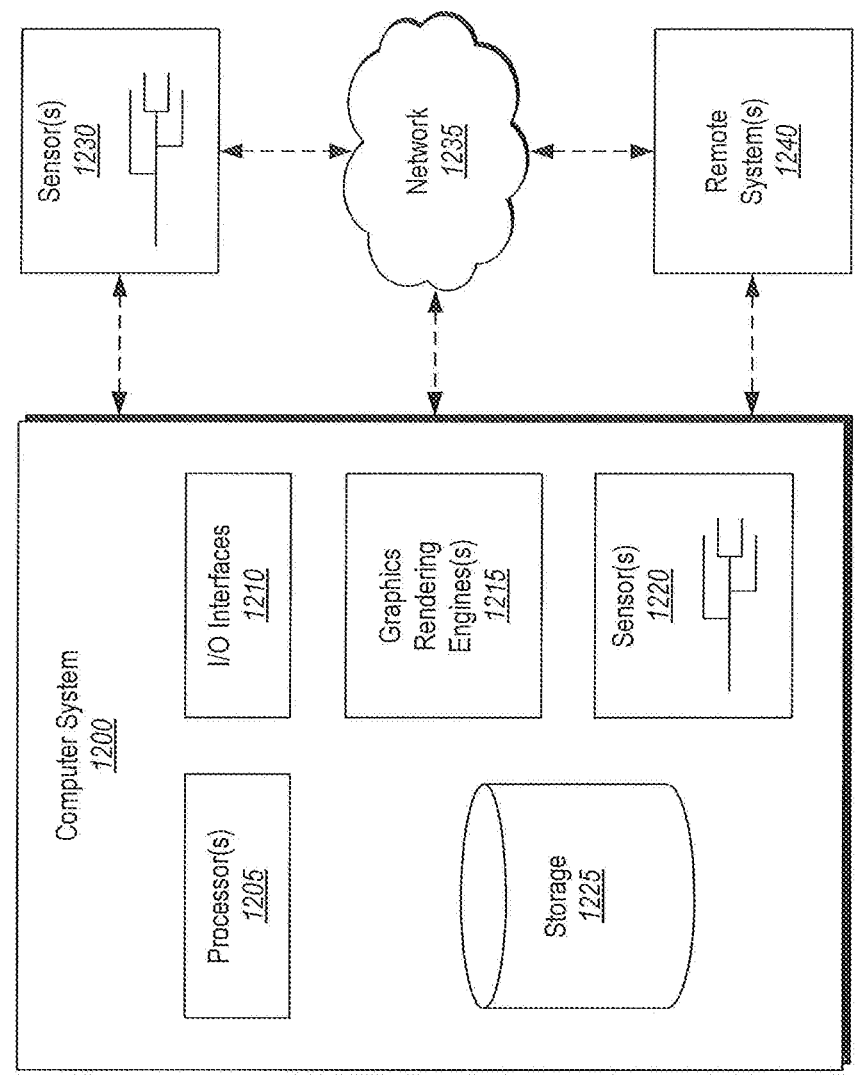
FIG. 12 illustrates an example computer system that may be used to perform embodiments disclosed herein.

Having just described the various features and functionalities of some of the disclosed embodiments, the focus will now be directed to FIG. 12 which illustrates an example computer system 1200 that may be used to facilitate the operations described herein. In particular, this computer system 1200 may be in the form of the HMDs or the projectors that were described earlier.

In fact, the computer system 1200 may take various different forms. For example, in FIG. 12, the computer system 1200 is embodied as a HMD. Although the computer system 1200 may be embodied as a HMD, the computer system 1200 may also be a distributed system that includes one or more connected computing components/devices that are in communication with the HMD. Accordingly, the computer system 1200 may be embodied in any form and is not limited strictly to the depiction illustrated in FIG. 12. By way of example, the computer system 1200 may include a projector, desktop computer, a laptop, a tablet, a mobile phone, server, data center and/or any other computer system.

In its most basic configuration, the computer system 1200 includes various different components. For example, FIG. 12 shows that computer system 1200 includes at least one hardware processing unit 1205 (aka a "processor"), input/output (I/O) interfaces 1210, graphics rendering engines 1215, one or more sensors 1220, and storage 1225. More detail on the hardware processing unit 1205 will be presented momentarily.

The storage 1225 may be physical system memory, which may be volatile, non-volatile, or some combination of the two. The term "memory" may also be used herein to refer to non-volatile mass storage such as physical storage media. If the computer system 1200 is distributed, the processing, memory, and/or storage capability may be distributed as well. As used herein, the term "executable module," "executable component," or even "component" can refer to software objects, routines, or methods that may be executed on the computer system 1200. The different components, modules, engines, and services described herein may be implemented as objects or processors that execute on the computer system 1200 (e.g. as separate threads).

The disclosed embodiments may comprise or utilize a special-purpose or general-purpose computer including computer hardware, such as, for example, one or more processors (such the hardware processing unit 1205) and system memory (such as storage 1225), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 1200 may also be connected (via a wired or wireless connection) to external sensors 1230 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses. Further, the computer system 1200 may also be connected through one or more wired or wireless networks 1235 to remote systems(s) 1240 that are configured to perform any of the processing described with regard to computer system 1200.

During use, a user of the computer system 1200 is able to perceive information (e.g., a mixed-reality environment) through a display screen that is included among the I/O interface(s) 1210 and that is visible to the user. The I/O interface(s) 1210 and sensors 1220/1230 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The graphics rendering engine 1215 is configured, with the hardware processing unit 1205, to render one or more virtual objects within the scene. As a result, the virtual objects accurately move in response to a movement of the user and/or in response to user input as the user interacts within the virtual scene.

A "network," like the network 1235 shown in FIG. 12, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 1200 will include one or more communication channels that are used to communicate with the network 1235. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components (e.g., the hardware processing unit 1205). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The disclosed embodiments provide various advantages over traditional HMD systems. Some of these advantages include providing a more robust and accurate depth determination for mixed-reality environments, particularly low light environments. Additionally, some of these advantages include the ability to track movement (e.g., head movement, hand movement, etc.) in any kind of environment, even low light environments. Furthermore, by repurposing existing hardware components, such as the head tracking cameras to additionally perform depth detection, the disclosed embodiments can reduce/simplify the costs, power consumption and form factor of the HMD systems.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for performing active stereo depth computation of a head-mounted display (HMD) in a surrounding environment, the system comprising:
   a projector comprising one or more dot pattern illuminators for projecting a dot pattern to the surrounding environment and that is at least partially reflected in the surrounding environment as reflected light, the projector being triggered to project the dot pattern in response to one or more triggering conditions, among which include a detected amount of ambient light or a detected number of anchor points being at a certain predetermined value; and
   the HMD, wherein the HMD is physically untethered from the projector, the HMD comprising:
      a first camera and a second camera having an overlapping field of view; and
      one or more processors and one or more computer-readable hardware storage devices having stored thereon computer-executable instructions that are executable by the one or more processors to cause the HMD to compute a depth of one or more objects within the overlapping field of view relative to the HMD and based at least in part on the reflected light from the dot pattern that is detected by both the first camera and the second camera,
      wherein triggering the projector to project the dot pattern, which is relied on to compute the depth of the one or more objects, is performed in response to determining that the detected number of anchor points, which are identified within the surrounding environment using the first camera and the second camera, is below a preselected number of anchor points.

2. The system of claim 1, wherein the system further includes one or more flood illuminators for projecting a flood of light to the surrounding environment and that is at least partially reflected from in the surrounding environment as reflected flood light detected by at least one of the first and second camera and that is used to track the movement of the HMD in the surrounding environment.

3. The system of claim 1, wherein the dot pattern is a pre-configured pattern that repeats itself in at least a horizontal direction.

4. The system of claim 1, wherein the projector includes one or more flood illuminators that project a flood of light to the surrounding environment.

5. The system of claim 1, wherein the one or more dot pattern illuminators are pulsed to synchronize with an exposure of at least one of the first camera or the second camera.

6. A system for performing tracking of a head-mounted display (HMD) in a surrounding environment, the system comprising:
- a projector comprising one or more infrared light dot pattern illuminators for projecting an infrared (IR) light dot pattern to the surrounding environment and that is at least partially reflected in the surrounding environment as reflected IR light, the projector being triggered to project the IR light dot pattern in response to one or more triggering conditions, among which include a detected amount of ambient light or a detected number of anchor points being at a certain predetermined value; and
- the HMD, wherein the HMD is physically untethered from the projector, the HMD comprising:
- a camera system having at least one camera sensor for detecting the reflected IR light; and
- one or more processors and one or more computer-readable hardware storage devices having stored thereon computer-executable instructions that are executable by the one or more processors to cause the HMD to track movement of the HMD based at least in part on the reflected IR light that is detected by the at least one camera sensor,
- wherein triggering the projector to project the IR light dot pattern, which is relied on to track the movement of the HMD, is performed in response to determining that the detected number of anchor points, which are identified within the surrounding environment using the camera system, is below a preselected number of anchor points.

7. The system of claim 6, wherein the camera system comprises a first camera and a second camera having an overlapping field of view and wherein the first camera and the second camera obtain corresponding images of the reflected IR light to perform depth detection of at least one object in the surrounding environment.

8. The system of claim 6, wherein the IR light dot pattern is a pre-configured pattern that repeats itself in at least a horizontal direction.

9. The system of claim 6, wherein the projector includes one or more IR flood illuminators that project a flood of IR light to the surrounding environment.

10. The system of claim 6, wherein the one or more infrared light dot pattern illuminators include at least a first illuminator and at least a second illuminator, the first illuminator projecting IR light with a different intensity than an intensity used by the second illuminator.

11. A method for performing at least one of depth detection and tracking with a head-mounted display (HMD) in an environment that includes a projector that is untethered from the HMD, the method comprising:
- causing the projector to project an infrared (IR) dot pattern onto objects located within the environment, the projector being triggered to project the IR light dot pattern in response to one or more triggering conditions, among which include a detected amount of ambient light or a detected number of anchor points being at a certain predetermined value;
- detecting at least a portion of the IR dot pattern with one or more cameras attached to the HMD; and
- utilizing the at least the portion of the IR dot pattern detected by the one or more cameras to perform at least one of depth detection and tracking with the HMD,
- wherein triggering the projector to project the IR light dot pattern, which is relied on to either perform the depth detection or to perform the tracking with the HMD, is performed in response to determining that the detected number of anchor points, which are identified within the environment using the one or more cameras, is below a preselected number of anchor points.

12. The method of claim 11, wherein the method includes utilizing the at least the portion of the IR dot pattern detected by the one or more cameras to perform the tracking with the HMD.

13. The method of claim 11, wherein the one or more cameras include a first camera and a second camera, and wherein the method includes utilizing the at least the portion of the IR dot pattern detected by the first and second cameras to perform the depth detection with the HMD.

14. The system of claim 1, wherein the one or more triggering conditions further includes determining that an ambient light intensity of the surrounding environment is below a threshold intensity value such that triggering the projector to project the dot pattern is performed in response to the ambient light intensity being below the threshold intensity value.

* * * * *